No. 627,316. Patented June 20, 1899.
A. ALLEN & E. MOREAU.
CLUTCH.
(Application filed Jan. 10, 1898.)
(No Model.)
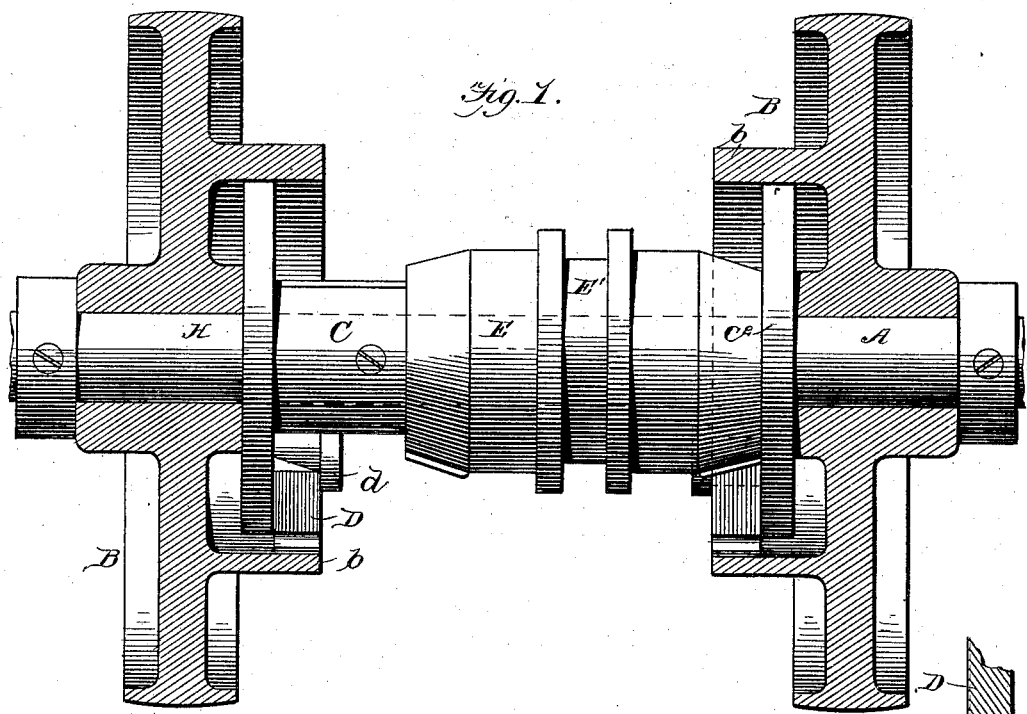
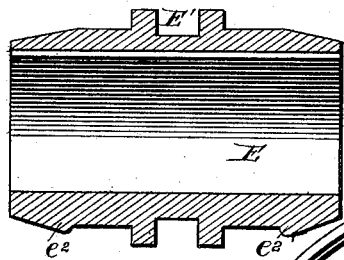
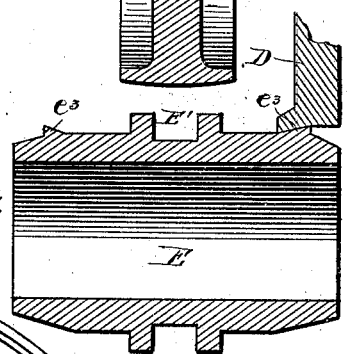
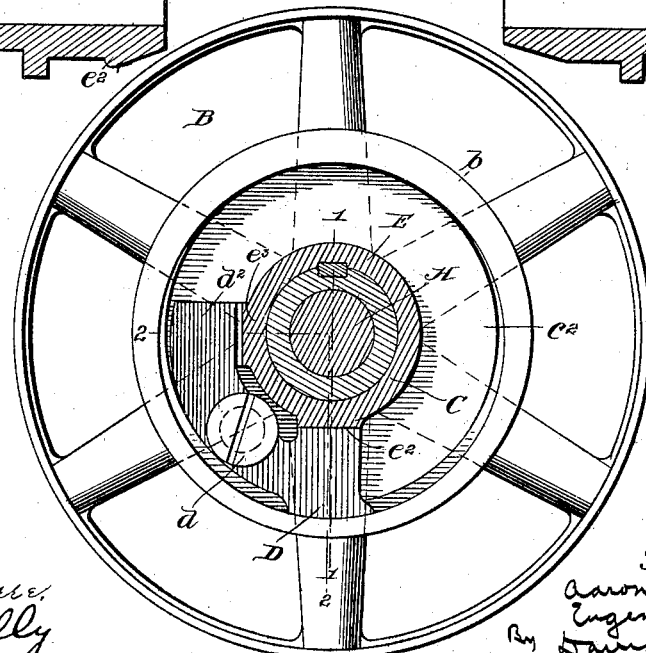
Witnesses
Inventors

UNITED STATES PATENT OFFICE.

AARON ALLEN AND EUGÈNE MOREAU, OF PHILADELPHIA, PENNSYLVANIA; SAID MOREAU ASSIGNOR TO SAID ALLEN.

CLUTCH.

SPECIFICATION forming part of Letters Patent No. 627,316, dated June 20, 1899.

Application filed January 10, 1898. Serial No. 666,131. (No model.)

*To all whom it may concern:*

Be it known that we, AARON ALLEN, a citizen of the United States, and EUGÈNE MOREAU, a citizen of the Republic of France, both residing at Philadelphia, in the county of Philadelphia and State of Pennsylvania, have invented certain new and useful Improvements in Clutches; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to clutches, and it relates particularly to clutches of the class which are used for connecting a continuously-moving shaft with and disconnecting it from another shaft to which motion is to be transmitted and which are also used for connecting and disconnecting the parts of a pulley, wherein one part is rigidly connected to a shaft and the other is capable of running loosely thereon, the motion being transmitted from a belt on the loose part through the clutch to the shaft or through the clutch and pulley to a belt carried by the loose part of the pulley.

The object of the invention is to produce a simple, cheap, and quick-acting clutch capable of universal use and in which the action of the parts will be positive, not depending upon uncertain frictional contact, and in which the fixed and loose parts of the device may be brought into contact or separated with slight exertion and without dangerous shock to the parts.

With these objects in view the invention consists of a clutch comprising a sleeve connected to a shaft in a manner to rotate therewith and to have a longitudinal movement thereon, a wheel or pulley loosely mounted on the shaft and provided with an eccentric ring, and a block adapted to be confined between the eccentric ring and the sleeve in a manner to cause the wheel or pulley to rotate with the shaft to which the sleeve is attached or to be moved from between the ring and the sleeve to allow the shaft to rotate independently of the shaft.

Further, the invention consists of a clutch comprising a sleeve connected to a shaft in a manner to cause it to rotate therewith, a wheel or pulley loosely mounted on the shaft and provided with an eccentric ring, a sliding sleeve, and a movable block adapted to be confined between the sliding sleeve and the eccentric ring, whereby the wheel or pulley and the shaft are caused to rotate together.

Further, the invention consists of a clutch comprising a sleeve connected to a shaft in a manner to cause it to rotate therewith, a wheel or pulley loosely mounted on the shaft and provided with an eccentric ring, a sliding sleeve keyed or otherwise secured to the sleeve on the shaft, and a movable block connected to the sleeve on the shaft and adapted to be confined between the eccentric ring and the sliding sleeve.

Further, the invention consists of a clutch comprising a sleeve connected to a shaft in a manner to cause it to move therewith, a wheel or pulley loosely mounted on the shaft and provided with an eccentric ring, a sliding sleeve keyed or otherwise secured to the sleeve on the shaft and provided with inclines, and a block pivoted to the sleeve and adapted to be moved on its pivot by the sliding sleeve to be confined between the sliding sleeve and the eccentric ring or to be released.

The invention is illustrated in the accompanying drawings, in which we have shown it as embodied in a clutch designed for connecting and disconnecting two adjacent loose pulleys with a shaft, the form shown being adapted for use in connection with a lathe or like tool where it is desirable to reverse the motion of the tool quickly and with little exertion.

In the drawings, Figure 1 is a side elevation of the clutch, the loose pulley and the eccentric ring being shown in section and the pivot of the block being shown in dotted lines. Fig. 2 is an end elevation, the shaft and the two sleeves being shown in section. Fig. 3 is a sectional view of the sliding sleeve, the section being taken on line 1 1 of Fig. 2; and Fig. 4 is a sectional view of the sliding sleeve, the section being taken on the line 2 2 of Fig. 2.

A represents a shaft, on which are loosely mounted the loose pulleys B, which have formed with or attached to them the rings $b$, which are eccentric to the shaft. The eccentric rings $b$ project from the pulleys B a sufficient distance to afford bearing-surface on their inner faces for the blocks hereinafter described, which serve to connect the loose pulleys to the shaft.

On the shaft A is a sleeve C, secured thereto by screws $c$, as shown, or in any other suitable way which will insure the rotating of the shaft and sleeve together. At each end of the sleeve C in the present form of clutch is a collar or rim $c^2$, but one of these being necessary when the clutch is used to connect a single pulley to a shaft or when the ends of adjacent shafts are to be connected.

Pivotally connected to each collar $c^2$ by suitable screws $d$ are blocks D, having the extensions $d^2$, the extensions being arranged on the opposite side of the screw to that on which the block is situated. The blocks are moved on their pivots by the sliding sleeve E, which is connected to the sleeve C by a spline and feather or in any other suitable way which will insure the turning of the sleeves together and will also permit independent longitudinal movement.

The sliding sleeve E is provided with a groove E' for the reception of a lever for moving it longitudinally, and its ends are each tapered, and each is provided with flattened portions $e^2$ $e^3$, designed to engage the blocks D and their extensions $d^2$, respectively. The flattened portions $e^2$ are tapered from their inner ends outward, while the flattened portions $e^3$ are slightly depressed from their outer ends to a point a short distance inward, so that a movement of the sliding sleeve toward the eccentric ring will cause the block to move outward, while the reverse movement will result in moving the block in an opposite direction.

The length of the block D in the direction of the diameter of the shaft is slightly greater than the distance between the flattened portion $e^2$ of the sliding sleeve and that portion of the inner face of the eccentric ring which is nearest the shaft. From this it will be seen that when the sliding sleeve is moved to bring the block into contact with the inner face of the eccentric ring the block will be confined (provided the shaft is in motion) closely between the ring and the sliding sleeve, connecting them and causing them and the parts connected thereto to rotate together. It will also be seen that a movement of the sleeve E in an opposite direction to that described will remove the sliding block from contact with the eccentric ring by bringing the flattened portion $e^3$ into contact with the extension $d^2$ as the sliding sleeve is moved away from the friction-ring.

It will be clear that in a clutch constructed as described there are no parts liable to undue wear or upon which excessive strain is imposed. The connecting of the eccentric ring and the sliding sleeve is done by confining the block between the two parts, the block acting as a wedge, and no strain is brought on the pivot of the block.

Having thus described our invention, what we claim as new, and desire to secure by Letters Patent, is—

1. A clutch comprising a sleeve connected to a shaft in a manner to rotate therewith and to have a longitudinal motion thereon, a wheel or pulley loosely mounted on the shaft and provided with an eccentric ring, and a block adapted to be confined between the eccentric ring and the sleeve, substantially as described.

2. A clutch comprising a sleeve connected to a shaft in a manner to cause it to rotate therewith, a wheel or pulley loosely mounted on the shaft and provided with an eccentric ring, a sliding sleeve, and a movable block adapted to be confined between the sliding sleeve and the eccentric ring, substantially as described.

3. A clutch comprising a sleeve attached to a shaft in a manner to cause it to rotate therewith, a wheel or pulley loosely mounted on the shaft and provided with an eccentric ring, a sliding sleeve keyed or otherwise connected to the sleeve on the shaft, a movable block connected to the sleeve on the shaft and adapted to be confined between the sliding sleeve and the eccentric ring, substantially as described.

4. A clutch comprising a sleeve connected to a shaft in a manner to cause it to rotate therewith, a wheel or pulley loosely mounted on the shaft, and provided with an eccentric ring, a sliding sleeve keyed or otherwise secured to the sleeve on the shaft and provided with inclines, and a block connected to the sleeve on the shaft and adapted to be moved on its pivot by the sliding sleeve, substantially as described.

5. A clutch comprising a sleeve attached to a shaft, a pulley loosely mounted on the shaft and provided with an eccentric ring, a sleeve attached to the sleeve on the shaft and having independent longitudinal movement, the longitudinally-moving sleeve being provided with flattened portions tapering in different directions, and a block having an extension connected to the sleeve on the shaft and designed to be engaged by the flattened portions of the sliding sleeve, substantially as described.

6. A clutch comprising a sleeve attached to a shaft in a manner to be caused to rotate therewith, a ring or collar at the end of the sleeve, a block having an extension mounted on the ring or collar, a sliding sleeve provided with a groove for the reception of a shifting-lever attached to the sleeve on the shaft in a manner to cause it to rotate therewith and to have independent longitudinal movement, projections on the sliding sleeve tapering in opposite directions, and a pulley or wheel loosely mounted on the shaft and provided with an eccentric ring, substantially as described.

In testimony whereof we affix our signatures in presence of two witnesses.

AARON ALLEN.
EUGENE MOREAU.

Witnesses:
GEO. W. JOHNES,
HARRY J. KENNEDY.